United States Patent
Derhak et al.

(10) Patent No.: US 9,373,063 B2
(45) Date of Patent: Jun. 21, 2016

(54) ESTABLISHING INK USAGE OF PROCESS CHANNELS

(75) Inventors: Maxim Wasyl Derhak, Brighton, NY (US); Rohit A. Patil, Sandy, UT (US)

(73) Assignee: Onyx Graphics, Inc., Midvale, UT (US)

( * ) Notice: Subject to any disclaimer, the term of this patent is extended or adjusted under 35 U.S.C. 154(b) by 584 days.

(21) Appl. No.: 13/035,855

(22) Filed: Feb. 25, 2011

(65) Prior Publication Data

US 2011/0210994 A1    Sep. 1, 2011

Related U.S. Application Data

(60) Provisional application No. 61/308,692, filed on Feb. 26, 2010.

(51) Int. Cl.
| | |
|---|---|
| *H04N 1/50* | (2006.01) |
| *H04N 1/60* | (2006.01) |
| *G06K 15/02* | (2006.01) |
| *B41F 33/00* | (2006.01) |

(52) U.S. Cl.
CPC ......... *G06K 15/027* (2013.01); *B41F 33/0045* (2013.01); *G06K 15/1878* (2013.01); *H04N 1/605* (2013.01); *H04N 1/6016* (2013.01); *H04N 1/6027* (2013.01); *H04N 1/6033* (2013.01); *H04N 1/6038* (2013.01)

(58) Field of Classification Search
USPC .......... 347/6; 358/1.2, 1.9; 345/207; 382/162
IPC ....................................................... B41J 29/38
See application file for complete search history.

(56) References Cited

U.S. PATENT DOCUMENTS

| | | | | |
|---|---|---|---|---|
| 5,357,448 | A | * | 10/1994 | Stanford ............. B41F 33/0036 358/534 |
| 5,537,516 | A | | 7/1996 | Sherman et al. |
| 5,551,342 | A | * | 9/1996 | Fuchs ................. B41F 33/0045 101/365 |
| 6,158,858 | A | | 12/2000 | Fujiike et al. |
| 6,796,240 | B2 | | 9/2004 | Sainio et al. |
| 6,843,546 | B2 | | 1/2005 | Nunokawa |
| 7,050,196 | B1 | | 5/2006 | Piatt et al. |
| 7,084,991 | B2 | | 8/2006 | Miguel et al. |
| 7,229,146 | B2 | | 6/2007 | Mahy |
| 7,382,490 | B2 | | 6/2008 | Lammens et al. |
| 8,125,687 | B2 | * | 2/2012 | Tin ................................ 358/1.9 |
| 8,373,897 | B2 | * | 2/2013 | Horita .................... H04N 1/603 358/1.9 |
| 8,870,319 | B2 | * | 10/2014 | Maltz ................... H04N 1/6061 347/14 |
| 2002/0176099 | A1 | * | 11/2002 | Gil et al. ......................... 358/1.2 |
| 2003/0020703 | A1 | * | 1/2003 | Holub ............................. 345/207 |
| 2003/0084800 | A1 | | 5/2003 | Anweiler et al. |
| 2003/0123072 | A1 | * | 7/2003 | Spronk .......................... 358/1.9 |
| 2005/0062985 | A1 | * | 3/2005 | Lammens et al. ............. 358/1.9 |
| 2005/0243335 | A1 | * | 11/2005 | Giesselmann ................. 358/1.9 |
| 2005/0281459 | A1 | * | 12/2005 | Bala et al. ...................... 382/162 |
| 2008/0239340 | A1 | | 10/2008 | Chang et al. |
| 2009/0091771 | A1 | | 4/2009 | Kuhn et al. |

* cited by examiner

*Primary Examiner* — Scott A Rogers
(74) *Attorney, Agent, or Firm* — Workman Nydegger

(57) ABSTRACT

Systems and methods for establishing ink usage of process channels are provided. Separation curves are generated that determine how multiple ink channels are used to render a corresponding process channel of an image. The separation curves are generated using process values and density measurements or estimations. A PVR curve is established to identify target densities. When a combination of ink channels are used, the model is accessed based on one of the ink channels to determine a contribution of the other ink channel to achieve the target density. Each ink channel has a corresponding curve and all of the curves collectively provide a smooth and predictable progression from zero coverage to full coverage for the ink channels.

20 Claims, 3 Drawing Sheets

ESTABLISHING INK USAGE OF PROCESS CHANNELS

CROSS-REFERENCE TO RELATED APPLICATIONS

This application claims the benefit of U.S. Provisional Application Ser. No. 61/308,692 filed on Feb. 26, 2010. The foregoing application is incorporated by reference in its entirety.

BACKGROUND OF THE INVENTION

1. The Field of the Invention

Embodiments of the invention relate to printing systems and processes. More particularly, embodiments of the invention relate to systems and methods for establishing ink usage of process channels including ink separation settings.

2. The Relevant Technology

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Printing processes are complex and often involve many variables that have an impact on the final print. Many of these variables relate to the ink used in the printing process. Many printing processes use multiple inks (e.g., cyan ink, light cyan ink, magenta ink, light magenta ink, yellow ink, black ink and light black ink (CMYKIclmlk) or other ink combinations and the printing process accounts for each ink while processing the image.

In the case of a CMYK device, the printing process typically includes a processing channel for each ink. A cyan processing channel may generate cyan image data that is printed using the cyan ink. Similarly, other processing channels for the magenta, yellow and black inks generate, respectively, magenta, yellow and black images. These images, once printed, generate the final image.

Printing processes can use multiple inks for each processing channel. More specifically, the cyan processing channel generates cyan image data, but there may be more than one corresponding ink or ink channel. In other words, the printing process may use a light cyan ink channel and a dark cyan ink channel.

As a result, the printing process decides how to use both ink channels when printing the image. This increased complexity makes it difficult to control ink usage. When the ink control settings are handled incorrectly, the gamut and the print quality are adversely affected.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
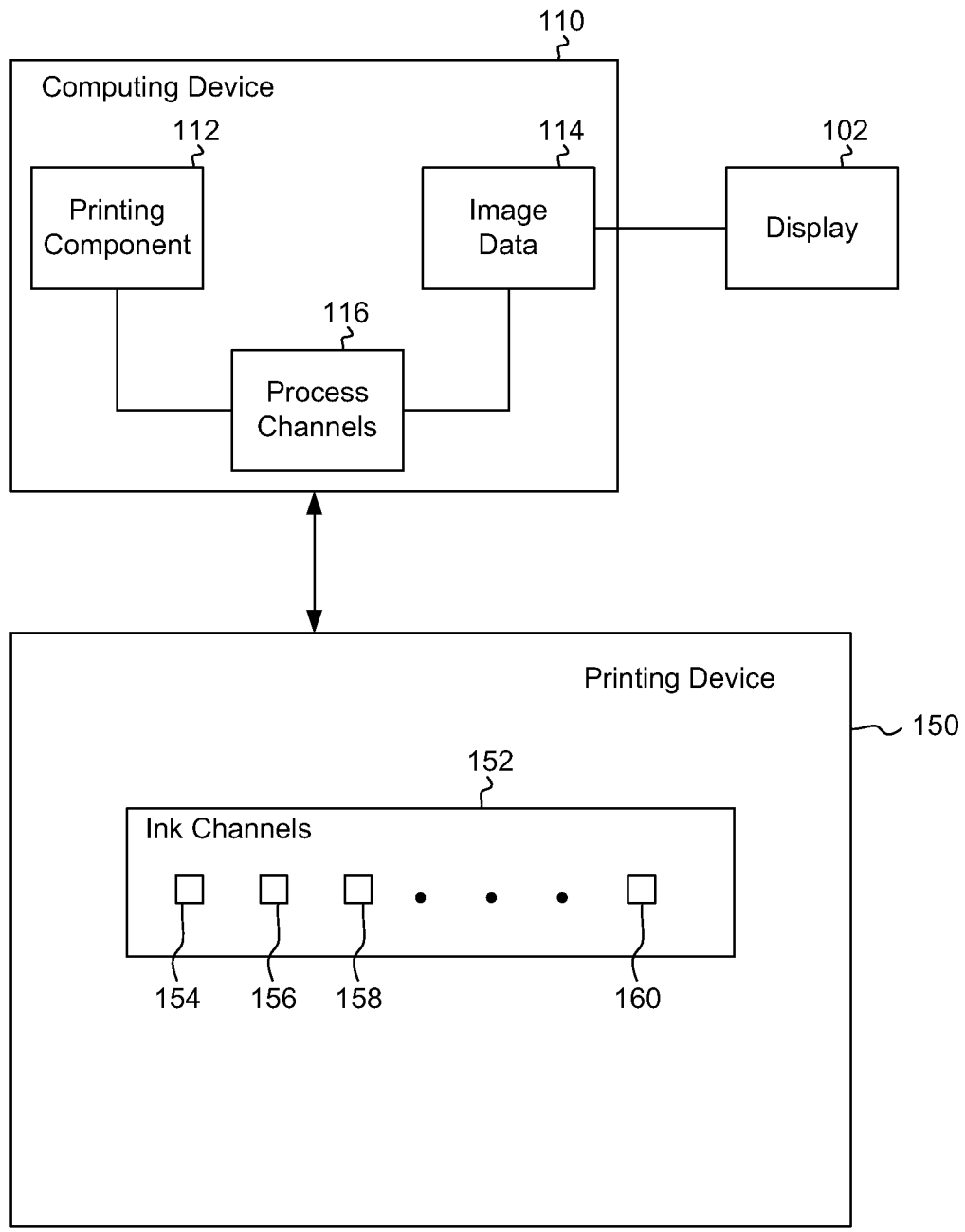
FIG. 1 illustrates one embodiment of a printing system including multiple ink channels.

Embodiments of the invention relate to ink settings in a printing system. Ink settings can include, by way of example only, ink restriction controls which determine the maximum amount of ink actually deposited and ink separation curves which define how multiple ink channels are used in a corresponding processing channel. Although embodiments of the invention are discussed in the context of ink, one of skill in the art can appreciate that other colorants may be used as well as different types of ink that are known to one of skill in the art. Embodiments of the invention can be used in multiple systems that deposit a substance or multiple substances on a surface.

As previously mentioned, each processing channel can be rendered with multiple inks (or other colorants) with the same hue. The ink coverage from zero coverage to full coverage can be defined using multiple inks with the same hue. Embodiments of the invention relate to systems and methods for setting restrictions (e.g., the maximum amounts of each ink channel) and for setting the transitions between ink channels of the same hue. Embodiments further relate to establishing the maximum amount of ink as well as establishing ink separations that determine how multiple ink channels are combined to form a single process channel with the desirable output characteristics of controlled ink use as well as smooth and predictable progression from zero coverage to full coverage.

Embodiments of the invention generate separation curves that determine how the various ink channels are used to render the corresponding process channel of an image. The curves can be established by considering the density of each hue, which is related to the spectral reflectance of the ink. For example, density may be a log of the spectral reflectance of the ink. Thus, the density essentially describes how much light is absorbed and is thus related to ink coverage.

When determining the ink separations for a process channel, the ink restrictions may first be determined. The ink restrictions, which can determine the maximum amount of ink that may be deposited on a media as well as the maximum ink for each individual ink channel, can be determined in a number of ways. For example, the ink restriction may be set as a percentage of full coverage. Thus, the process channel may evaluate an image from 0 to 100 percent coverage, which may correspond to 0 to 94 percent ink values. Thus, the maximum ink is restricted.

The ink restriction can also be defined in terms of density. For instance, the density of cyan may range from 0 to 2.2. An ink restriction may be placed at some percentage of the density (e.g., 94% of the density of the maximum allowed ink or coverage). Similarly, ink restrictions can also be defined for other ink channels in the same hue. For example, the light cyan may be restricted to 0.7 density, a medium cyan may be restricted to 1.5 density and a dark cyan may be restricted to 2.1 density. In another example, the ink restrictions may be set using the percentage density of the darkest ink. The darkest ink may be restricted to 94% of its maximum density and the lightest ink may be set to 30% of the restricted dark ink density. Embodiments of the invention contemplate other percentages and ink restrictions. This demonstrates that the actual ink values may be restricted as a whole and/or with respect to individual ink channels. The foregoing examples are exemplary—other density values can be selected. In addition, the ink settings for the ink channels of one hue may be different from the ink settings of another hue. The ink restrictions, by way of example only, can be set with reference to 100 percent coverage, with reference to the restricted maximum density, with respect to other ink settings, and the like or any combination thereof.

Once the ink restrictions are determined, embodiments of the invention can then generate the separation curves. The separation curves can be generated using process values and density measurements or density estimations. As further discussed below, the separation curves generated in accordance with embodiments of the invention can be combined to form a single process channel with controlled ink use as well as smooth and predictable progression from zero coverage to full coverage (which may be a restricted ink amount).

In addition, embodiments of the invention allow for users to establish starting points of the ink channels, ending points of the ink channels, and/or ink transitions from one ink to another ink while maintaining a predictable progression from zero coverage to full coverage.

FIG. 1 illustrates an example of a printing system for establishing ink or colorant usage. FIG. 1 illustrates a printing system 100 that includes a computing device 110, a display 102, and a printing device 150. The printing system 100 can be implemented in a network configuration. For instance, the computing device 110 may be a server computer in a network that is connected with the display 102 (which may be a client computing device with a display) and the printing device 150 over a network (e.g., a local area network, a wide area network, the Internet, or the like or any combination thereof).

The computing device 110 includes a printing component 112 that operates on image data 114 and interacts with the printing device 150 to print the image data 114 on a media after processing. When the image data 114 is being prepared for printing, the printing capabilities of the printing device 150 are often considered. For example, when the computing device 110 is preparing the image data 114 for printing, the computing device 110 may have a processing channel for each hue of ink.

The computing device 110 may prepare the image data 114 in terms of the primary colors of the printing device. In the case of a CMYK printing device, the printing component 112 or the computing device 110 may prepare a cyan image, a magenta image, a yellow image, and a black image that correspond generally with the ink channels 152 of the printing device 150. The computing device 110 may have a process channel 116 for each primary color of the printing device.

For each of the process channels 116, as previously mentioned, the printing device 150 may have multiple inks or ink channels with the same hue. In this example, the printing device 150 includes ink channels 152. The ink channels include individual channels 154, 156, 158 . . . 160. Each ink channel is typically a particular hue. For example, a CMYK printing device may include a cyan channel, a magenta channel, a yellow channel, and a black channel.

As previously stated, each processing channel may correspond to multiple inks with the same hue. Thus, a CMYK printing device may include a light cyan channel and a dark cyan channel. Similarly, the magenta, yellow, and black colorants may include light and dark channels. In yet another example, the ink channels 154, 156, and 158 may be, respectively, a light ink channel, a medium ink channel, and a dark ink channel of the same hue (e.g., cyan, magenta, yellow, or black). Similarly, the ink channels may include multiple ink channels for each hue.

The ink settings (e.g., ink restrictions and separation curves) can be used to determine which ink channels are actually used to deposit ink on a media. For example, the ink restrictions may impact which ink channels are used for a desired coverage value. In some instances, a desired value could be achieved using a medium ink channel. In another instance, the same desired coverage value could be achieved using a combination of a light ink channel and a darker ink channel.

In some embodiments, there may be a single ink channel for each process channel or a single ink channel for only some of the process channels. For example, CMYK based system may have multiple ink channels for cyan ink, magenta ink, and black ink while only having a single ink channel for yellow. In this case, the ink settings, including ink restriction, may apply. Embodiments of establishing or determining ink usage account for each ink channel.

Figure 2:
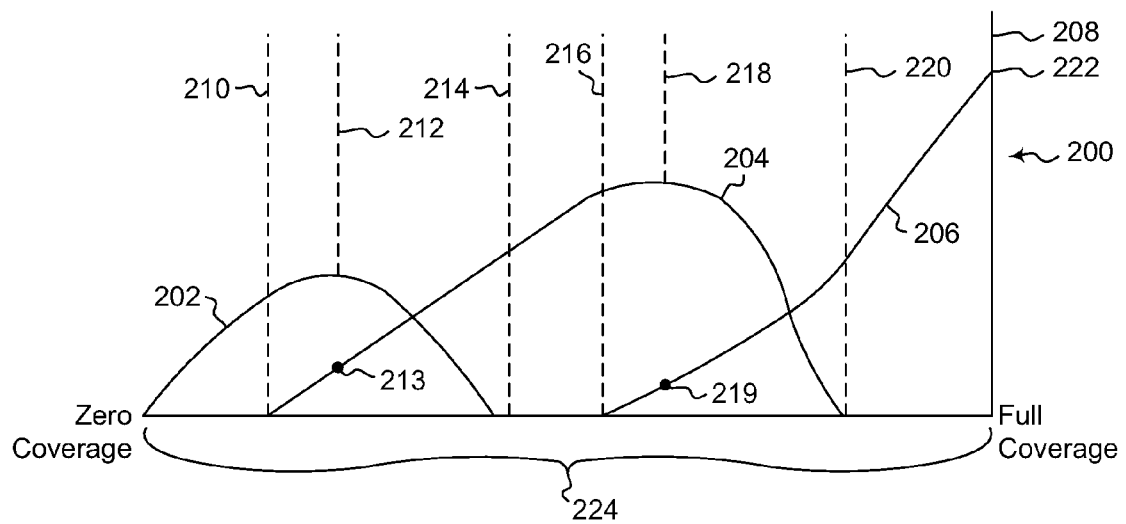
FIG. 2 illustrates an example of ink separation curves for multiple ink channels of the same hue.

FIG. 2 illustrates an example of ink separation curves associated with a process channel. The curves 200 include, in this example, a light ink curve 202, a medium ink curve 204, and a dark ink curve 206. The curves 202, 204, and 206 can be for a specific hue (e.g., cyan, magenta, yellow, or black). The curves 200 also illustrate ink separations between the ink channels. The curves 200 start at zero coverage and extend to full coverage. Full coverage can vary according to various factors, including user settings, media type, and the like.

In this example, the light ink curve 202 begins at zero coverage and extends to an ending point 214. The light ink curve 202 has a peak 212. At lower densities, only the light ink channel may be used to deposit ink to achieve a desired density. FIG. 2 illustrates, however, that the medium ink curve 204 overlaps with the light ink curve 202. In this example, the medium ink curve 204 begins at the point 210, which is prior to the peak 212 of the link ink curve 202.

Some of these locations may be selected by a user. Starting points, peak points, and ending points are examples of locations that may be selected by a user. For instance, the starting point 210 of the medium ink curve, the peak 212 of the light ink curve 202, etc., may be selected by a user. Some of the reasons for selecting certain locations include ink use, ink cost, print quality, and the like.

The medium ink curve 204 has a peak 218 and an end point 220. The dark ink curve 206 begins at point 216 and increments to the point 222, which corresponds to full coverage. As previously explained, the full coverage may be restricted.

The ink separation curves 200 determine how the light ink channel, the medium ink channel, and the dark ink channel are combined and can result in a smooth and predictable progression from zero coverage to full coverage.

Figure 3:
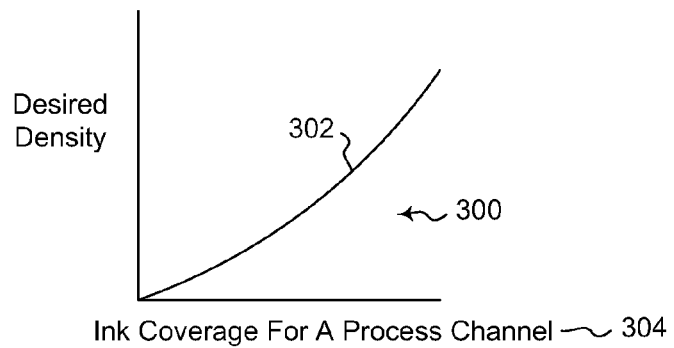
FIG. 3 illustrates an example of a curve that establishes a relationship between process values and target or desired densities.

The generation of the ink separation curves 202, 204, and 206 may also involve the use of a process value to desired density relationship (PVR) curve illustrated in FIG. 3. The PVR curve 300 illustrates a relationship between a target or desired density and the desired ink coverage for a process channel. In one example, FIGS. 2 and 3 are related in the sense that FIG. 3 illustrates the desired density for a desired ink coverage of a process channel while FIG. 2 illustrates how the various ink channels are separated and used to achieve the target density. Thus, the ink coverage 224 in FIG. 2 is the same as the ink coverage 304 in FIG. 3. In one example, the curve 302 represents the ink separation curves 200 prior to being separated.

Figure 4:
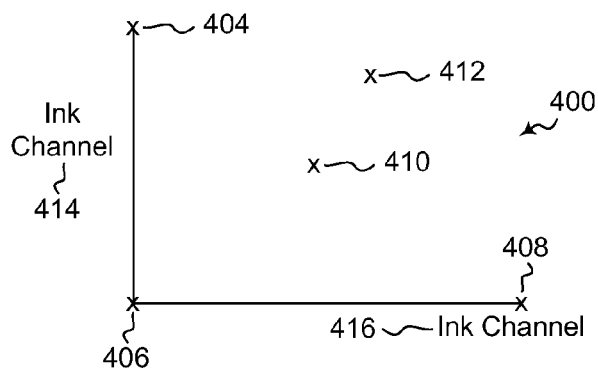
FIG. 4 is an example of a model for determining densities of ink combinations.

The generation of the ink separation curves 200 may also use a model illustrated in FIG. 4. The model 400 can be used to find points for ink restricted combination points and then used to estimate the spectral reflectance (and thus the density) of ink combinations. The model 400 may establish a relationship between a first ink channel 414 and a second ink channel 416. For example, the model 400 may establish a relationship between the light ink channel and the medium ink channel or between the medium ink channel and the dark ink channel. One of skill in the art can appreciate that other dimensions can be added as necessary such that all inks can be represented in the model 400. Alternatively, separate models 400 can be generated for each ink combination represented in a swatch that was previously generated (as described below).

In one example, the point 404 represents the spectral reflectance of 100 percent coverage (which may be restricted such that it is actually less than 100 percent coverage) of the light ink and the point 406 represents zero percent coverage. The point 408 represents 100 percent coverage of the medium ink (although it may also be restricted as previously described). The point 410 represents the known spectral reflectance of the patch corresponding to the combination of the light ink and the medium ink. With this information, the spectral reflectance of any point, such as the point 412, can be determined, for example by weighted regression techniques.

Figure 5:
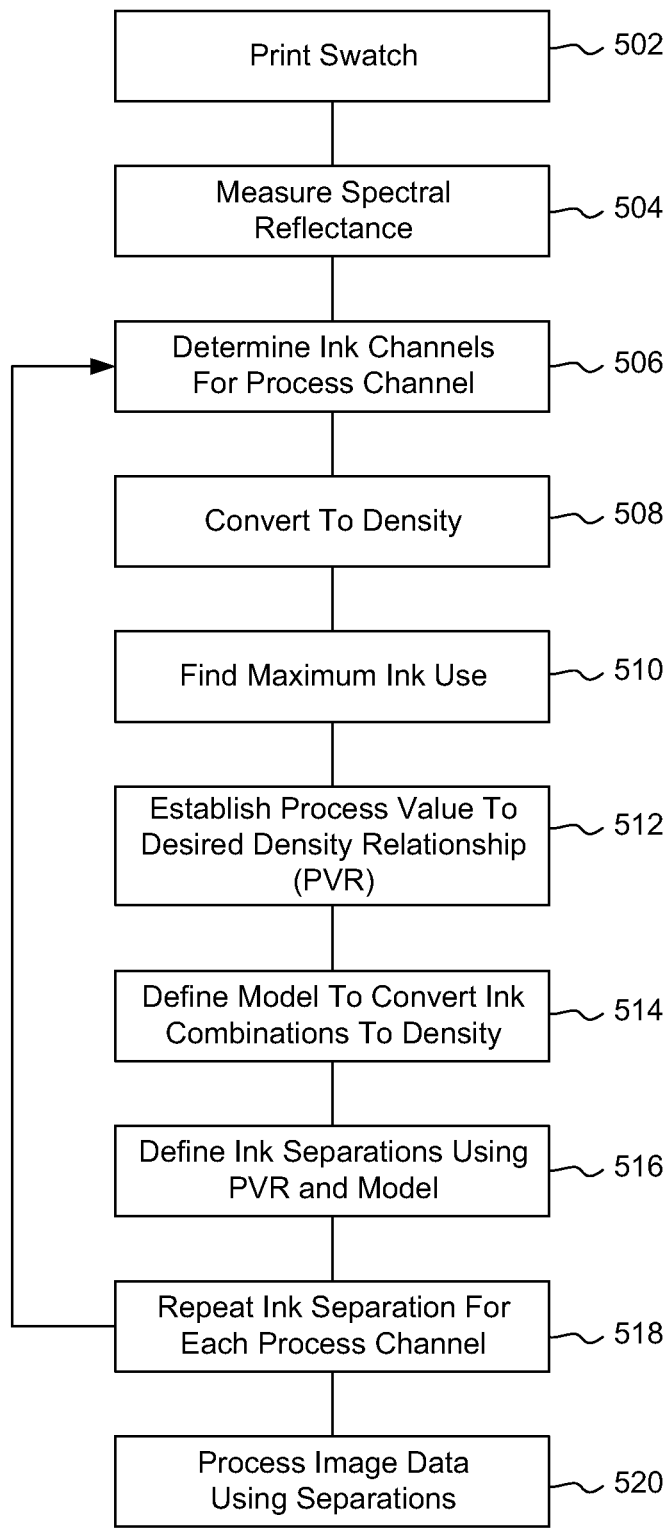
FIG. 5 is a flow diagram illustrating an example of a method for establishing ink usage in a printing system.

FIG. 5 illustrates an example of a method for establishing ink usage. The method may begin by printing 502 a swatch. The swatch typically includes multiple patches for each ink channel in the printing system. There may be a series of patches that may range from zero coverage to full coverage for each ink channel in the swatch. For instance, the light ink channel (of each hue) may include 10 different patches ranging from 10 percent coverage to 100 percent coverage for that ink channel. The swatch may include similar patches for medium or dark ink channels as well. In addition, the swatch may also include patches that represent combinations of ink. One patch may be 50 percent light ink and 50 percent medium ink while another patch may be 50 percent medium ink and 50 percent dark ink when there are a light, medium and dark ink of a given hue. The combination patches are generated, in one embodiment, according to the number of ink channels in each hue or according to the possible combinations. For a process channel associated with three ink channels, four combination patches may be generated.

Once the swatch is printed, the spectral reflectance of each patch in the swatch is measured 504. The spectral reflectance of each patch can be stored, for example, in the model 400 in one example as previously described. Next, the ink channels for each process channel are determined 506. For each ink channel, the corresponding spectral reflectance values are converted to density 508. Thus, the densities are determined for each patch of each ink channel of each hue in one example.

Next, the maximum ink use is determined 510. The maximum ink use can be determined for each ink channel individually or for all ink channels collectively. The maximum ink use may be an example of an ink restriction and can include ink restrictions for each ink channel from the darkest ink to the lightest ink. The maximum use of the lighter inks can be determined relative to the maximum density of the darkest ink. The ink restriction can be expressed in terms of scaling factors. In an example that uses 4 ink channels (a dark ink and successively lighter inks) in a given process channel, the scaling factors may be 94%, 32%, 16%, and 8% going from the darkest ink to the lightest ink. In this example, the dark ink percent (94%) is relative to the maximum density of the dark ink channel. Once this value is set, the lighter inks can be relative percentages to the ink restricted dark ink density.

Next, a PVR curve is generated 512 that establishes a relationship between the target densities to process values or ink coverage values. For example, a process channel may generate a process value or desired ink coverage value for a pixel (a pixel may be a predetermined area of the image or relate to the image in terms of individual dots placed by the printing device, or the like) or other portion of the image. From the process value, the target density is determined. The target density can then be used to determine how the ink channels are used in generating the target density. For instance, the target density may be achieved by a single ink channel or from a combination of two or more ink channels.

A model is then defined 514 to convert ink combinations to density. FIG. 4, as previously described, presents a model to convert ink combinations to densities. In one example, the contribution of one of the inks is known. The model can be used to determine how much of the other ink channel is required to achieve the target density. With respect to the separation curves, there are areas where the light ink curve overlaps with the medium ink curve or where the medium ink curve overlaps with the dark ink curve. When the contribution from the medium ink channel (or one of the other ink channels) is known or selected, the contribution from the light ink channel (or other ink channel) can be determined using the model to generate the separation curve. In at least this manner, the ink separations can be defined 516 using the PVR and the model.

After the ink separation curves are defined for a single process channel, the ink separation is repeated 518 for each of the other process channels. After the ink separations for all process channels have been determined, the image data 114 can be processed 520 using the established ink settings, including the ink separation curves.

The following discussion expands on the elements of FIG. 5 (and other Figures) in establishing ink usage.

Establishing ink usage for process channels may begin by printing a swatch. The swatch may include patches from zero to one hundred percent for each ink (e.g., in increments of 5%, 10%, or other increment). The swatch may also include patches for each midlevel combination of the inks. These patches in the swatch are then measured spectrally and can be converted to densities.

Next, the ink or coverage restrictions are found or selected for the various inks (e.g., light, medium, and/or dark inks). Initial maximum density scaling factors can be selected. The density scaling factors can impact how much ink is deposited as well as the shape of the curves 200. Once the density scaling factors are selected, the maximum coverage density for the darkest ink is determined. The dark ink target density can be determined by the maximum dark ink/coverage density times the maximum density scaling factor for the darkest ink. In another embodiment, the target density of the dark ink can also be specified directly. The user may also have the ability to define the maximum target density achievable by the process channel. The maximum achievable target density can be used to set the ink restriction setting of the darkest ink. The ink restrictions for the other ink channels associated with the process channel can be set relative to the restricted dark ink.

A similar procedure can be followed for the less dark inks, typically beginning with the next less dark ink. After finding the maximum density, the associated target density is determined by taking the minimum of (i) the dark target density times the light density scaling factor and (ii) the maximum density times the maximum density scaling factor for the darkest ink. The ink restriction equals the coverage that achieves the target density.

Next, a model can be used to convert ink amount to density. Regression, including weighted regression, can be used to find or estimate the spectral reflectance of ink combinations. In one example, regression is combined with a Yule-Nielsen-Spectral-Neugebauer model to estimate spectral reflectance. The spectral reflectance can then be concerted to density. Target densities for each desired ink coverage can be established or determined using the model.

Separation curves (such as illustrated in FIG. 2) are then generated or determined for each ink associated with a process channel. As described in more detail, the separation curves can be considered in sections. The sections may be from where the current ink curve begins to where the next darkest ink begins. The next section may be from the beginning of the transition to the next darkest ink to the peak of the current ink. The next section may be the overlap of the current ink and the next darkest ink from the peak of the current ink to the end of the current ink. These sections are illustrated in FIG. 2.

The separation curves may be determined by considering the lightest ink first in one example. For example, FIG. 1 illustrates a light ink 154, a darker or medium ink 156 and a darkest ink 158 in a given hue. The separation curves for the inks 154, 156, and 158 can be determined described herein.

First, the ink coverage where the next darkest ink transition point 210 starts and the density at the point 210 are determined. The density associated with the peak 212 plus the darker ink 156 at point 213 may also be determined. The density associated with the point 214 is also determined, which is the point where the light ink 154 is no longer added to the darker ink 156. These points or some of these points can be determined using user input or automatically.

These points or some of these points can be used in the generation of the curves 200 including the curve 202. In particular, these points or some of these points can be used to generate the curve 202 in sections.

The first section from the beginning of the curve 202 to the point 210 is accomplished as follows. The ink coverage value for a process channel is incremented from zero coverage to the transition point where the next darkest ink begins. For each ink coverage value, the PVR curve is used to find the desired target density. The model is then used to find or estimate the desired ink coverage or ink amount that achieves the target density. A point is then added to the separation curves that relates the desired ink value to actual light ink used for each of the ink coverage values considered in this first section.

The next section of the light ink curve from the beginning of the medium ink curve to the peak of the light ink curve is determined. In this section, the desired target density is determined using the PVR curve from the transition start density (density at the point 210 where the medium ink begins) to the peak light ink density (at point 212) while simultaneously incrementing the darker ink coverage.

In one example, the coverage of the medium ink may be selected (or externally defined) for this section between the point 210 and the peak point 212. With the coverage of the medium ink known, the model can be used to find the coverage value for the lighter ink that achieves desired density (determined using the PVR curve) when combined with the medium ink. In other words, the desired density is determined from the PVR curve, and the coverage value for the lighter ink that is needed to achieve the desired density can be determined by performing a search using the model according to the known medium ink coverage value. The separation curve for the section between the point 210 and the peak point 212 can thus be determined as different desired ink coverage values are selected and points are added to the separation curves according to the selected coverage values. The separation curves can be filled in, in some embodiments, using interpolation.

The next section of the light ink curve from the peak 212 to the end point 214 of the curve 202 is determined. In this section of the light ink curve, the corresponding light ink coverages may be selected or externally defined. Typically, the contribution of the light ink decreases in this section as the contribution of the medium ink increases. The contribution of the light ink can be selected and this section of the curve 202 can have any desired shape.

As the desired ink coverage continues to increase in this section from the peak 212 to the point 214, the desired density is determined from the PVR curve. Thus, the required coverage of the medium ink can be determined by performing a search using the model with the known light ink coverage and the desired target density for each desired target coverage. Points can thus be added to the separation curves curve 204 as desired target coverage values are selected and used in combination with the known light ink densities to determine the medium ink densities that result in estimating the medium ink densities needed to achieve the desired target coverage values.

The section from the point 214 to point 216 only the medium ink channel is used and the target densities are known. Thus, this section of the curve 204 can be determined in a manner similar to the section from zero coverage to point 210. The remaining sections of the curves 200 can be similarly determined.

The curves can also be generated as follows.

For each point on the x-axis from zero coverage to the point 210, the desired target density is known from the PVR curve because there is only one ink being used in this section (the lightest ink—the others are zero). The desired density for each point is passed to the model along with the zero ink amounts for other channels to find out the unknown amount of the light ink. The determined values then form the y-axis values of the curve 202 from zero coverage to the point 210.

When the model is multidimensional, all known densities can be passed to the model. For example, at the point 213, the density of the medium ink is selected or known, the density of the dark ink channel is zero and the target density is known. The model can return the density of the light ink.

For each point on x-axis from 210 to 212, the medium ink amounts or densities are known. The desired target densities are also known from the PVR curve. Thus, the model can be used to determine the ink amount of the light ink. As a result, the combination of light ink and medium ink should result in the desired target coverage.

In another example for each point on the x-axis from the point 210 to the point 212, the light ink amounts or densities may be known or selected instead of the medium ink amounts. In this case, the model can be used to determine the ink amount of the medium ink.

Next, for each point on x-axis from the point 212 to the point 214, the light ink curve 202 and the desired target densities can be selected or are known. As previously described, the model can be used to determine the medium ink amounts or densities from the known data.

For each point on x-axis from the point 214 to the point 216, there is only medium ink present. Although the amount of ink is unknown, the target density is known. As a result, the model can be used to determine the medium ink amount in this section as described with respect to the section of the light ink curve 202 from the zero coverage point to the point 210.

The foregoing processes can be repeated with the remaining sections of the medium and dark inks until the separation curves are generated.

In addition, in the instance where there is only one ink channel for a process channel, the densities for a given coverage value or process value can be determined, for example, like the portion of the curve 202 from the zero coverage point to the point 210.

One of skill in the art can appreciate that the user can have control over how the various ink channels are used while being assured of a smooth and predictable progression from zero coverage to full coverage. Further, a user can control ink usage and costs by selecting certain portions of the curves. For example, the contribution or use of the light ink can be controlled by setting or selecting the curve of the medium ink in the section from the point 210 to 212. Increasing the contribution of the medium ink decreases the contribution of the light ink to achieve a desired coverage value.

In this manner, points in the separation curves 200 can be determined from zero coverage to full coverage. With known points, the curves can be completed using interpolation or other technique.

In another embodiment, the ink contributions for a given process value can be generated dynamically during processing.

The embodiments described herein may include the use of a special purpose or general-purpose computer including various computer hardware or software modules, as discussed in greater detail below. At least some of the embodiments of the invention can be implemented in a computer, in a printer or printing system, or in a combination thereof or in a network environment. The printer may also include computer-readable medium Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware and/or firmware are also possible and contemplated. In this description, a "computing entity" or "computing device" may be any computing system as previously defined herein, or any module or combination of modulates running on a computing system. A "printing device" may also have elements of a computer or computing device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for establishing ink usage of process channels in a printing system that includes multiple inks in at least one of the process channels, the method comprising:
   printing a swatch that includes multiple patches for each process channel in the printing system and combination patches for at least some of the process channels;
   measuring a spectral reflectance for each of the patches;
   converting each spectral reflectance to a density, wherein each density includes a log of the spectral reflectance;
   determining a maximum ink use;
   establishing a PVR curve for each process channel, wherein the PVR curve establishes a relationship between a desired ink coverage value and a target density;
   defining a model for determining densities for combinations of the inks in the printing system for each process channel, wherein the model uses the densities generated from the spectral reflectances of each of the patches to determine densities of other ink combinations; and
   determining ink separation curves for the multiple inks of each process channel using the PVR curve associated with each process channel and the model and the maximum ink use, wherein a target density is achieved for a given ink coverage value using one or more of multiple inks in each process channel in accordance with the ink separations,
   wherein the multiple inks of each process channel that has multiple inks include at least a light ink and a dark ink of the same hue.

2. The method of claim 1, wherein the combination patches includes at least two inks of different hues.

3. The method of claim 1, wherein the maximum ink use is less than or equal to 100 percent.

4. The method of claim 1, wherein at least some of the ink separation curves overlap.

5. The method of claim 4, wherein determining ink separation curves includes selecting a coverage for one of the multiple inks and then determining a coverage value for another of the multiple inks using the model.

6. The method of claim 4, wherein at least some coverage values are selected by a user, wherein the coverage values correspond to a density.

7. The method of claim 4, wherein the ink separations are configured to combine the multiple inks to have a smooth and predictable progression from zero coverage to full coverage using the multiple inks in a corresponding process channel.

8. In an system that includes multiple inks of the same hue for at least one process channel, a method for determining ink separation curves for the multiple inks for purposes of processing and printing, wherein the ink separation curves determine ink amounts of the multiple inks for an image for the at least one process channel, the method comprising:

identifying a target density for each of a plurality of points on a PVR (a process to desired density relationship) curve for the at least one process channel, wherein the PVR curve relates a desired density of ink coverage to a desired ink coverage for each of the multiple inks in the at least one process channel, wherein the desired density corresponds to a log of a spectral reflectance;

identifying first density ink amounts for the multiple inks in the at least one process channel, wherein the first density ink amounts correspond to a portion of the plurality of points; and accessing a model using the target density and the corresponding first density ink amounts for the portion of the plurality of points to determine first channel ink amounts and an additional channel ink amounts for the portion of the plurality of points, wherein the first channel ink corresponds to a first ink included in the multiple inks and an additional channel ink corresponds to at least a second ink included in the multiple inks for the at least one process channel, wherein the first channel ink amounts and the additional channel ink amounts achieve the target densities for the portion of the plurality of points and wherein the first channel ink amounts establish at least a portion of first ink separation curves and the additional channel ink amounts establish at least a portion of the additional ink separation curve for the multiple inks in the at least one process channel, wherein the model uses densities generated from spectral reflectances of patches from a printed swatch to determine densities of other ink combinations.

9. The method of claim 8, further comprising generating the PVR curve using user input.

10. The method of claim 8, wherein at least some of the first density ink amounts are predetermined.

11. The method of claim 8, wherein the model converts an ink amount to a density and wherein the model determines a density for each of the additional channel ink amounts using weighted regression.

12. The method of claim 8, wherein the model has multiple dimensions to determine densities for multiple inks.

13. The method of claim 8, wherein one or more of the first ink separation curves overlap with the additional ink generation curve.

14. The method of claim 13, wherein one or more of the first ink separation curves are for lighter inks than the additional ink separation curve.

15. The method of claim 13, wherein one or more of the first ink separation curves are for darker inks than the additional ink separation curve.

16. The method of claim 8, wherein the initial set of inks and the additional channel ink amounts have the same hue.

17. The method of claim 8, further comprising determining ink restrictions for the initial set of inks and the additional channel ink.

18. A method for determining ink separation curves for multiple inks of each process channel for processing and printing, the method comprising:

for each process channel that includes at least a lighter ink and a darker ink of the same hue in a printing system:

determining ink channels for the process channel, the ink channels including a first ink channel associated with the lighter ink and a second ink channel associated with the darker ink;

converting spectral reflectance values for the ink channels to densities wherein each density includes a log of each spectral reflectance value;

generating a PVR (a process channel to desired density relationship) curve to establish a relationship between target densities and ink coverage values for the process channel;

converting ink combinations of the multiple inks in the process channel to densities using a model, wherein the model determines a contribution of the darker ink when a contribution of the lighter ink is known such that the combinations achieve the target densities wherein the model uses densities generated from spectral reflectances of patches from a printed swatch to determine densities of other ink combinations; and defining ink separation curves for the ink channels using the PVR curve and the model, wherein the ink separation curves define a relationship between at least the lighter ink and the darker ink for the target densities such that the ink coverage values are achieved using the ink separation curves for the process channel.

19. The method of claim 18, further comprising determining a maximum ink coverage for the ink channels.

20. The method of claim 18, further comprising printing the image using the ink separation curves, wherein the ink separation curves are configured to combine the ink channels to have a smooth and predictable progression from zero coverage to full coverage using the multiple inks in a corresponding process channel.

* * * * *